July 18, 1939.    A. H. GAEBEL    2,166,523
SUPPORTING MEANS
Filed March 3, 1937
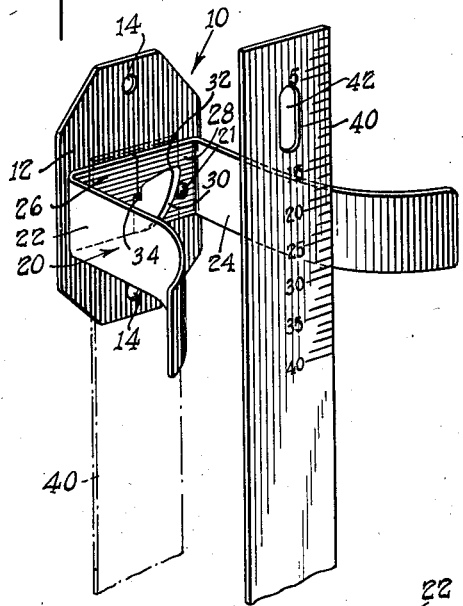
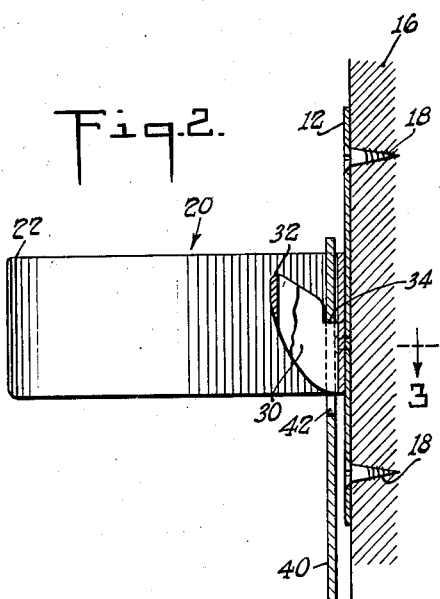
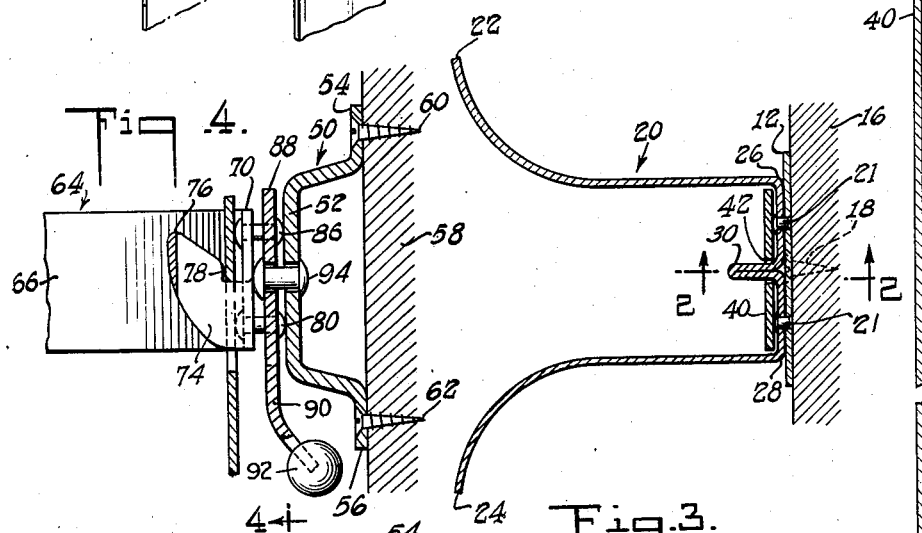
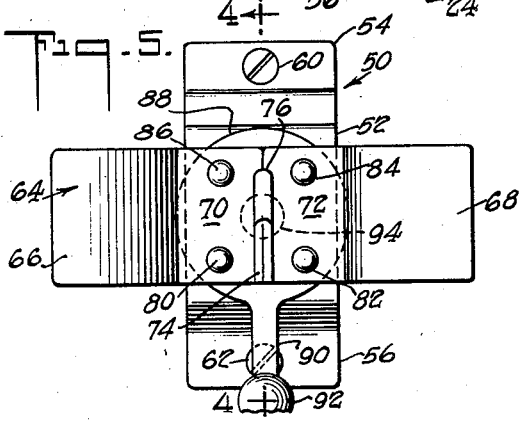
INVENTOR
Arthur H. Gaebel
BY
ATTORNEYS Patented July 18, 1939

2,166,523

UNITED STATES PATENT OFFICE 2,166,523

SUPPORTING MEANS

Arthur H. Gaebel, Larchmont, N. Y.

Application March 3, 1937, Serial No. 128,711

6 Claims. (Cl. 248—304)

My invention relates to supports, and particularly supporting means for long narrow objects such as rules, straight-edges, T-squares, and the like.

While such conventional arrangements as a nail extending from the wall and a hole in the rule, or a loop of string on the rule, serve well enough for some purposes, there are circumstances where such crude arrangements are a distinct source of trouble and loss of valuable time.

For example, in a newspaper plant the printer's rule is in nearly constant use, and to be always at hand must be kept in a particular place. To ensure the ruler being put there each time after it is used the support means must be of maximum convenience for speedy replacement as well as withdrawal of the ruler. The least difficulty or delay in the operation of replacing the rule will tend to make the worker using it at one time not trouble to replace it for someone else's convenience, whereupon the next user does not find it in its place and has to look around and lose valuable time in finding it. In a shop specializing in rush work, such as printing entire "extra" editions in a few minutes, each second's delay may be of extreme importance, and should be obviated, if at all possible.

While my invention is illustratively described in connection with a printer's rule, it is obviously of broader application, and it is to be understood that it may be applied in many other embodiments.

It is an object of my invention to provide a supporting means of maximum convenience and speed for withdrawal and more particularly replacement of the supported rule or the like.

It is a further object of my invention to provide a support which guides the rule or the like into place, and specifically to provide a supporting device which will automatically center the rule and lead it onto the supporting hook.

It is a further object of my invention to provide a support having centering guide means for the rule, which support will normally hang in one position but can swing to adapt itself to the angle at which the rule is presented.

It is a further object of my invention to provide a rule whose markings are more easily readable.

In the drawing, where I have shown illustrative embodiments of my invention,

Fig. 1 is a perspective view of a support and a printer's rule in accordance with my invention, the rule being shown in full lines before being positioned, and in dotted lines when in place;

Fig. 2 is a vertical section taken on the line 2—2 of Fig. 3;

Fig. 3 is a horizontal sectional view taken on the line 3—3 of Fig. 2;

Figs. 4 and 5 illustrate a modification of my invention, Fig. 4 being a vertical section taken on the line 4—4 of Fig. 5, and Fig. 5 being an elevation.

The ruler support of my invention is designated generally by reference numeral 10. A base plate or wall bracket 12 is provided with holes 14, by which it may be attached to a wall 16 or the like, as by screws 18.

A length of strip metal 20 is bent to form guide arms 22, 24, foot portions 26, 28, and projection or hook 30. The formed strip is fastened to the base plate 12, as by rivets 21.

The hook 30 extends upwardly and outwardly to a point 32, and is provided with a relatively deep narrow vertical groove 34 at the rear, which groove is just a little wider from front to back than the thickness of the rule or other device to be supported.

The guide arms 22, 24 extend out initially in the same direction as the projection or hook and are approximately parallel for a distance beyond the extent of projection of the hook. The distance between the parallel portions of the guide arms is just a little greater than the width of the rule or other device to be supported, and the projection or hook is substantially centered between the two guide arms.

The outer half or so of the guide arms 22, 24 are flared outwardly, preferably with arcuate curvature, to a width about twice the distance between the parallel portions, or more. Preferably the strip 20 of which the guide arms 22, 24 are formed is of substantial width, such as one inch or so, and the point 32 of the hook 30 is positioned vertically within the space between the guide arms.

As illustrative of devices to be supported I have shown a printer's rule 40. Preferably near one end thereof the rule 40 has formed therein a slot-form opening 42 which is substantially centered transversely and is wider than the hook 30 and longer than the vertical length of the hook 30.

The operation of my device is extremely simple and easy. To remove the rule from the support the user merely lifts it off, upwardly and outwardly.

Replacing the rule is the operation which in ordinary supports requires some care and a few seconds time, because of which users heretofore have frequently not taken the trouble to replace the rule, thereby causing confusion and delay when the rule is needed the next time, possibly by a different person.

With my device the replacing operation is extremely simple, and in fact just as easy as the removing operation.

The user simply slaps the rule anywhere within the guide arms, bringing it downwardly at the same time. The guide arms automatically bring it in from either side to proper alignment, and the rule slides down bearing against the hook until the slot comes opposite the hook and the rule slips into place over the hook.

In Figs. 4 and 5 I have illustrated a modification of my invention, in which the guide and hook portions of the device are together free to swing, while normally assuming a vertical position.

In these figures, 50 indicates a base plate having a flat portion 52 and bent legs 54, 56 which are attached to a wall or the like 58 as by screws 60, 62, thereby spacing portion 52 away from the wall.

A length of strip metal 64 is bent to provide guide arms 66, 68, foot portions 70, 72, and hook 74 having upwardly projecting point 76 and slot 78, all as in the first-described form.

To the foot portions 70, 72 of this member 64 is fastened, as by four rivets 80, 82, 84 and 86, a plate member 88 having downwardly depending arm 90 which is curved back toward the wall and ends in weight 92. The plate member 88 is secured to flat portion 52 of base plate 50 in such way as to allow swinging in a plane parallel to the wall. Rivet 94 illustrates such a method of attachment. The rivet 94 has sufficient looseness to allow free swinging.

The inner heads of the rivets 80, 82, 84, 86 bear against the face of flat portion 52 of base plate 50, preventing the rotatable unit from canting out of its plane and binding on pivotal rivet 94, while these rivet heads at the same time provide friction-reducing contacts.

The weight 92 is so proportioned as to balance the whole of the pivotally mounted structure in the plane of plate 88, where it is supported by rivet 94. The spacing of the device out from the wall allows arm 90 to be bent back to accomplish this balance, and spaces the rule or other supported device away from the wall for ready grasping.

The printer's rule which I have illustrated as used with my support is provided with a novel and advantageous form of marking.

Instead of the usual marking arrangement of having longer marks of various lengths for the major division points and short marks of a uniform length for all the intermediate points, I have devised what may be called a pipe organ arrangement.

In this arrangement the division marks are in successive groups, each mark along each group being longer than the mark next to it, and corresponding marks of the several groups are of the same length. The first division mark is the shortest, the next is longer, and each successive one progressively longer, until a major division point is reached. The following mark is again of the same short length as the first, and the following ones pregressively longer up to the next major division point, which is the same length as the first major mark, and so on for the length of the rule.

In the drawing I have shown the marks for 1 agate, 6 agates, 11 agates, etc. as the shortest; the marks for 2, 7, 12, etc. agates longer; the marks for 3, 8, 13 etc. agates longer; the marks for 4, 9, 14, etc. agates longer; and the marks for the major divisions of 5, 10, 15 etc. agates the longest.

This arrangement of markings is much clearer and easier to read, and much less likely to be erroneously read.

While I have illustrated and described certain specific embodiments of my invention it must be understood that it is capable of embodiment in whole or in part in a variety of constructions, and for a variety of uses other than in connection with printer's rules. Accordingly the scope of my invention is not to be taken as confined to the illustrated forms but only as fairly limited by the appended claims.

I claim:

1. A supporting means for a generally long narrow object including a projection, guide arms extending out in the same general direction as said projection at the sides thereof, said guide arms being generally parallel for a distance adjacent said projection and flaring outwardly therebeyond, said guide arms being pivotally mounted.

2. Device of claim 1 in which means are provided yieldingly urging said guide arms to assume a generally horizontal position.

3. Device of claim 1 in which a weighted downwardly extending arm yieldingly urges said guide arms to assume a generally horizontal position.

4. A supporting means for a generally long narrow object including a wall bracket having a flat vertical face spaced out from the wall, and a unit pivotally connected thereto for rotation in the plane of the flat face, said unit including a hook projection, a pair of guide arms to the sides of said hook projection and extending out beyond said hook projection in the same general direction then flaring outwardly, and a weighted arm which extends down and back under said wall bracket.

5. A supporting means for a generally long narrow object having a single strip of metal bent to form a projection and guide arms extending out in the same general direction as said projection, one at each side thereof, and then flaring outwardly.

6. A supporting means for a generally long narrow object having an upwardly and outwardly extending projection whose top edge slants down and is terminated in a relatively deep narrow groove and whose front edge slopes down and in, and a pair of guide arms to the sides of said projection extending out in the same general direction.

ARTHUR H. GAEBEL.